United States Patent
Malakoff

(10) Patent No.: US 9,493,591 B2
(45) Date of Patent: Nov. 15, 2016

(54) ETHYLENE BASED POLYMERS AND ARTICLES MADE THEREFROM

(71) Applicant: ExxonMobil Chemical Patents Inc., Baytown, TX (US)

(72) Inventor: Alan M. Malakoff, Boynton Beach, FL (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 0 days.

(21) Appl. No.: 14/780,620

(22) PCT Filed: Jan. 31, 2014

(86) PCT No.: PCT/US2014/014102
§ 371 (c)(1),
(2) Date: Sep. 28, 2015

(87) PCT Pub. No.: WO2014/185996
PCT Pub. Date: Nov. 20, 2014

(65) Prior Publication Data
US 2016/0032035 A1 Feb. 4, 2016

Related U.S. Application Data

(60) Provisional application No. 61/823,039, filed on May 14, 2013.

(30) Foreign Application Priority Data

Aug. 1, 2013 (EP) ..................................... 13178915

(51) Int. Cl.
*C08F 210/02* (2006.01)
*C08F 210/16* (2006.01)
*C08J 5/18* (2006.01)

(52) U.S. Cl.
CPC ............... *C08F 210/16* (2013.01); *C08J 5/18* (2013.01); *C08J 2323/04* (2013.01); *C08J 2323/06* (2013.01)

(58) Field of Classification Search
CPC ............... C08F 210/16; C08F 2500/08; C08F 2500/10; C08F 2500/11; C08F 2500/12; C08F 2500/26
See application file for complete search history.

(56) References Cited

U.S. PATENT DOCUMENTS

| | | | | |
|---|---|---|---|---|
| 7,125,933 B2 * | 10/2006 | German | ................ | B32B 27/322 525/191 |
| 7,135,526 B2 * | 11/2006 | Farley | ..................... | C08L 23/06 525/191 |
| 7,153,571 B2 * | 12/2006 | Allermann | ............ | C08F 255/00 428/391 |
| 7,172,816 B2 * | 2/2007 | Szul | ........................ | B29C 47/92 428/523 |
| 7,601,409 B2 * | 10/2009 | Ohlsson | .................. | B32B 27/32 428/34.1 |
| 8,907,018 B2 * | 12/2014 | Bellehumeur | ............. | C08J 5/00 264/503 |
| 9,062,138 B2 * | 6/2015 | Ker | ........................ | C08F 210/16 |
| 9,074,082 B2 * | 7/2015 | Wang | .................. | C08L 23/0815 |
| 9,127,094 B2 * | 9/2015 | Hoang | .................. | C08F 4/6494 |
| 2011/0045295 A1 * | 2/2011 | Vogt | ....................... | B29C 41/003 428/375 |
| 2012/0130006 A1 * | 5/2012 | Van Den Bossche | ..... | C08J 5/18 524/528 |

FOREIGN PATENT DOCUMENTS

| EP | 1 927 617 | 6/2008 |
|---|---|---|
| WO | WO98/44011 | 10/1998 |
| WO | WO2004/022634 | 3/2004 |

* cited by examiner

*Primary Examiner* — Rip A Lee

(57) ABSTRACT

An ethylene-based polymer comprising about 80.0 to 99.0 wt. % of polymer units derived from ethylene and about 1.0 to about 20.0 wt. % of polymer units derived from one or more $C_3$ to $C_{20}$ α-olefin comonomers; the ethylene-based polymer having: a CDBI of 60% to 80%; a melt index, $I_{2.16}$, of about 4.0 to about 12.0 g/10 min.; a high-load melt index, $I_{21.6}$, of 80.0 to about 160.0 g/10 min.; a melt index ratio ($I_{21.6}/I_{2.16}$) of 9.0 to 40.0; and a density of from about 0.910 to about 0.930 g/cm$^3$. Articles, such as films, particularly suitable for use in pre-stretch applications, produced from such polymers and methods of making such articles are also provided.

20 Claims, No Drawings

ETHYLENE BASED POLYMERS AND ARTICLES MADE THEREFROM

CROSS-REFERENCE OF RELATED APPLICATIONS

This application is a National Stage Application of International Application No. PCT/US2014/014102, filed Jan. 31, 2014, which claims the benefit of Ser. No. 61/823,039, filed May 14, 2013, the disclosure of which is incorporated by reference.

FIELD OF THE INVENTION

The present invention is directed to metallocene-catalyzed ethylene-based polymers, blends of such ethylene-based polymers, and articles made therefrom. Methods of making articles, particularly films are also described.

SUMMARY OF THE INVENTION

In one aspect, embodiments described herein provide ethylene-based polymers comprising about 80.0 to 99.0 wt. % of polymer units derived from ethylene and about 1.0 to about 20.0 wt. % of polymer units derived from one or more $C_3$ to $C_{20}$ α-olefin comonomers; the ethylene-based polymer having a CDBI of 60% to 80%; a melt index, $I_{2.16}$, of about 4.0 to about 12.0 g/10 min.; a high-load melt index, $I_{21.6}$, of 80.0 to about 160.0 g/10 min.; a melt index ratio ($I_{21.6}/I_{2.16}$) of 9.0 to 40.0; and a density of from about 0.910 to about 0.930 g/cm³.

In another aspect, embodiments described herein provide films comprising an ethylene-based polymer comprising about 80.0 to 99.0 wt. % of polymer units derived from ethylene and about 1.0 to about 20.0 wt. % of polymer units derived from one or more $C_3$ to $C_{20}$ α-olefin comonomers; the ethylene-based polymer having a CDBI of 60% to 80%; a melt index, $I_{2.16}$, of about 4.0 to about 12.0 g/10 min.; a high-load melt index, $I_{21.6}$, of 80.0 to about 160.0 g/10 min.; a melt index ratio ($I_{21.6}/I_{2.16}$) of 9.0 to 40.0; a density of from about 0.910 to about 0.930 g/cm³; wherein the film has a MD Ultimate Tensile strength value of $5.500 \times 10^3$ to $10.00 \times 10^3$ psi and a Break Elongation of $4.00 \times 10^2$ to $7.50 \times 10^2$%.

In yet another aspect, embodiments of the invention provide films comprising an ethylene-based polymer comprising about 80.0 to 99.0 wt. % of polymer units derived from ethylene and about 1.0 to about 20.0 wt. % of polymer units derived from one or more $C_3$ to $C_{20}$ α-olefin comonomers; the ethylene-based polymer having a CDBI of 60% to 80%; a melt index, $I_{2.16}$, of about 6.0 to about 10.0 g/10 min.; a high-load melt index, $I_{21.6}$, of 110.0 to about 160.0 g/10 min.; a melt index ratio ($I_{21.6}/I_{2.16}$) of 10.0 to 22.0; and a density of from about 0.914 to about 0.926 g/cm³; wherein the film has a MD Tensile at Yield value of $7.50 \times 10^2$ to $11.00 \times 10^2$ psi and a Break Elongation of $4.00 \times 10^2$ to $7.50 \times 10^2$%, a MD Ultimate Tensile strength value of $5.500 \times 10^3$ to $10.00 \times 10^3$ psi, a TD Tensile at Yield value of $6.00 \times 10^2$ to $10.00 \times 10^2$ psi, and a TD Ultimate Tensile strength value of $5.000 \times 10^3$ to $9.000 \times 10^3$ psi.

DESCRIPTION OF EMBODIMENTS OF THE INVENTION

Embodiments of the invention provide ethylene-based polymers having a unique combination of properties, particularly suitable for films for use in stretch applications.

In the following description, all numbers disclosed herein are approximate values, regardless whether the word "about" or "approximate" is used in connection therewith. They may vary by 1%, 2%, 5%, and sometimes, 10 to 20%. Whenever a numerical range with a lower limit, $R^L$ and an upper limit, $R^U$, is disclosed, any number falling within the range is specifically disclosed. In particular, the following numbers within the range are specifically disclosed: $R=R^L+k*(R^U-R^L)$, wherein k is a variable ranging from 1% to 100% with a 1% increment, i.e., k is 1%, 2%, 3%, 4%, 5%, ..., 50%, 51%, 52%, ..., 95%, 96%, 97%, 98%, 99%, or 100%. Moreover, any numerical range defined by two R numbers as defined in the above is also specifically disclosed.

Ethylene-Based Polymers

The ethylene-based polymers herein refer to a polyethylene copolymer having about 99.5 to about 51.0 wt. %, 99.0 to 65.0 wt. %, 99.0 to 75.0 wt. %, 99.0 to 85.0 wt. %, or 99.0 to 95.0 wt. %, of polymer units derived from ethylene and about 0.5 to about 49.0 wt. %, 1.0 to 35.0 wt. %, 1.0 to 25.0 wt. %, 1.0 to 15.0 wt. %, 1.0 to 5.0 wt. %, or 1.0 to 3.0 wt. % of polymer units derived from one or more $C_3$ to $C_{20}$ α-olefin comonomers, preferably $C_3$ to $C_{10}$ α-olefins, and more preferably $C_4$ to $C_8$ α-olefins. The α-olefin comonomer may be linear or branched, and two or more comonomers may be used, if desired. Examples of suitable comonomers include propylene; 1-butene; 1-pentene; 1-pentene with one or more methyl, ethyl, or propyl substituents; 1-hexene; 1-hexene with one or more methyl, ethyl, or propyl substituents; 1-heptene; 1-heptene with one or more methyl, ethyl, or propyl substituents; 1-octene; 1-octene with one or more methyl, ethyl, or propyl substituents; 1-nonene; 1-nonene with one or more methyl, ethyl, or propyl substituents; ethyl, methyl, or dimethyl-substituted 1-decene; 1-dodecene; and styrene. Particularly suitable comonomers include 1-butene, 1-hexene, and 1-octene, 1-hexene being most preferred.

The ethylene-based polymers preferably have a composition distribution breadth index (CDBI) of 60% or more, preferably 60% to 80%, preferably 65% to 80%. CDBI is generally the weight percent of the ethylene-based polymer having a comonomer content within ±25% of the median comonomer content. The CDBI of a copolymer is readily determined utilizing well-known techniques for isolating individual fractions of a sample of the copolymer. One such technique is Temperature Rising Elution Fractionation (TREF), as described in Wild, et al., J. Poly. Sci. Poly. Phys. Ed., vol. 20, p. 441 (1982), which is incorporated herein by reference.

To determine CDBI, a solubility distribution curve is first generated for the copolymer. This may be accomplished using data acquired from TREF techniques described above. This solubility distribution curve is a plot of the weight fraction of the copolymer that is solubilized as a function of temperature. This is converted to a weight fraction versus composition distribution curve. For the purpose of simplifying the correlation of composition with elution temperature the weight fractions less than 15,000 are ignored. These low weight fractions generally represent a trivial portion of the plastomer of the present invention. The remainder of this description and the appended claims maintain this convention of ignoring weight fractions below 15,000 in the CDBI measurements.

From the further details of determining CDBI of a copolymer are known to those skilled in the art, see, for example, PCT Patent Application No. WO 93/03093, published Feb. 18, 1993.

The ethylene-based polymers preferably have a melt index, $I_{2.16}$, of about 4.0 to about 12.0 g/10 min., particularly 5.0 to 11.0 g/10 min., or 6.0 to 10.0 g/10 min., more particularly 7.0 to 9.0 g/10 min., as determined in accordance with ASTM D-1238 under a load of 2.16 kg and at a temperature of 190° C. Some ethylene-based polymers also have a high-load melt index, $I_{21.6}$, of about 80.0 to about 160.0 g/10 min., particularly about 110.0 to about 160.0 g/10 min., more particularly about 120.0 to about 140.0 g/10 min., about 125.0 to about 135.0 g/10 min., or about 127.5 to about 132.5 g/10 min., as determined in accordance with ASTM D-1238 under a load of 21.6 kg and at a temperature of 190° C. The melt index ratio ($I_{21.6}/I_{2.16}$) of the ethylene-based polymers has a lower limit of about 9.0 and an upper limit of about 40.0. In particular embodiments, the lower limit on the melt index ratio may be 9.0, 10.0, 12.0, 14.0, 15.0, 16.0, 17.0, 18.0, 20.0, 22.0, 25.0, 27.5, 30.0, 35.0, 37.5, or 40.0. The upper limit on the melt index ratio may be 16.0, 17.0, 18.0, 20.0, 22.0, 25.0, 27.5, 30.0, 35.0, 37.5, or 40.0. Any combination lower and upper limits should be considered to be disclosed by the above limits on the melt index ratio, e.g., 9.0 to 40.0, 12.0 to 20.0, 14.0 to 18.0, 10.0 to 22.0, etc.

Particular ethylene-based polymers have a density of from about 0.910 to about 0.930 g/cm³; more particularly 0.912 to 0.928 g/cm³, 0.914 to 0.926 g/cm³, 0.915 to 0.920 g/cm³, or 0.917 to 0.919 g/cm³, determined using chips cut from plaques compression molded in accordance with ASTM D-1928 Procedure C, aged in accordance with ASTM D-618 Procedure A, and measured as specified by ASTM D-1505.

Typically, although not necessarily, ethylene-based polymers have a molecular weight distribution (MWD, defined as $M_w/M_n$) of about 2.0 to about 5.5, preferably 3.0 to 5.0, or 3.5 to 5.0. The expression $M_w/M_n$ is the ratio of the weight average molecular weight ($M_w$) to the number average molecular weight ($M_n$). The weight average molecular weight is given by $$M_w = \frac{\sum_i n_i M_i^2}{\sum_i n_i M_i}$$

The number average molecular weight is given by $$M_n = \frac{\sum_i n_i M_i}{\sum_i n_i}$$

The z-average molecular weight is given by $$M_z = \frac{\sum_i n_i M_i^3}{\sum_i n_i M_i^2}$$

where $n_i$ in the foregoing equations is the number fraction of molecules of molecular weight $M_i$. Measurements of $M_w$, $M_z$, and $M_n$ are typically determined by Gel Permeation Chromatography as disclosed in Macromolecules, vol. 34, no. 19, p. 6812 (2001).

The ethylene-based polymers herein generally have little to no long chain branching. Particular ethylene-based polymers have from 0.0 to about 2.0 long chain branches/1000 total carbons, from 0.0 to about 1.5 long chain branches/1000 total carbons, from 0.0 to about 1.0 long chain branches/1000 total carbons, from 0.0 to about 0.5 long chain branches/1000 total carbons, from 0.0 to about 0.3 long chain branches/1000 total carbons, from 0.0 to about 0.2 long chain branches/1000 total carbons, from 0.0 to about 0.1 long chain branches/1000 total carbons, from 0.0 to about 0.05 long chain branches/1000 total carbons, from 0.0 to about 0.02 long chain branches/1000 total carbons, or 0.0 to about 0.01 long chain branches/1000 total carbons. Ethylene-based polymers having no measurable long chain branching are preferred.

Various methods are known for determining the presence of long-chain branches. For example, long-chain branching can be determined using $^{13}C$ nuclear magnetic resonance (NMR) spectroscopy and to a limited extent, e.g. for ethylene homopolymers and for certain copolymers, and it can be quantified using the method of Randall (Journal of Macromolecular Science, Rev. Macromol. Chem. Phys., C29 (2&3), pp. 285-297). Although conventional $^{13}C$ NMR spectroscopy cannot determine the length of a long-chain branch in excess of about six carbon atoms, there are other known techniques useful for quantifying or determining the presence of long-chain branches in ethylene-based polymers, such as ethylene/1-octene interpolymers. For those ethylene-based polymers wherein the $^{13}C$ resonances of the comonomer overlap completely with the $^{13}C$ resonances of the long-chain branches, either the comonomer or the other monomers (such as ethylene) can be isotopically labeled so that the long-chain branches can be distinguished from the comonomer. For example, a copolymer of ethylene and 1-octene can be prepared using $^{13}C$-labeled ethylene. In this case, the resonances associated with macromer incorporation will be significantly enhanced in intensity and will show coupling to neighboring $^{13}C$ carbons, whereas the octene resonances will be unenhanced.

Alternatively, the degree of long-chain branching in ethylene-based polymers may be quantified by determination of the branching index. The branching index, g', is typically 0.950 to 1.00. For particular ethylene-based polymers the lower limit on the branching index, g', may be 0.950, 0.960, 0.970, 0.975, 0.980, 0.985, 0.990, 0.995, 0.997, or 0.999. Likewise, the upper limit on the branching index, g', may be 0.960, 0.970, 0.975, 0.980, 0.985, 0.990, 0.995, 0.997, 0.999, or 1.00. Any combination lower and upper limits should be considered to be disclosed by the above limits on the branching index, e.g., 0.960 to 0.999, 0.985 to 0.995, 0.997 to 1.00, 0.999 to 1.00, etc. The branching index, g', is defined by the following equation:

$$g' = \frac{IV_{Br}}{IV_{Lin}}\bigg|_{M_w}$$

where g' is the branching index, $IV_{Br}$ is the intrinsic viscosity of the ethylene-based polymer and $IV_{Lin}$ is the intrinsic viscosity of a linear polyethylene control sample selected to the same weight average molecular weight and molecular weight distribution as the ethylene-based polymer, and in the case of copolymers and terpolymers, substantially the same relative molecular proportion or proportions of monomer units. For these purposes, the molecular weight and molecular weight distribution are considered "the same" if the respective values for the branched polymer and the corresponding linear polymer are within 10% of each other. Preferably, the molecular weights are the same and the MWD of the polymers are within 10% of each other. A method for determining intrinsic viscosity of polyethylene is described in Macromolecules, 2000, 33, pp. 7489-7499. Intrinsic viscosity may be determined by dissolving the linear and branched polymers in an appropriate solvent, e.g. trichlorobenzene, typically measured at 135° C. Another method for measuring the intrinsic viscosity of a polymer is ASTM D-5225-98 Standard Test Method for Measuring Solution Viscosity of Polymers with a Differential Viscometer, which is incorporated by reference herein in its entirety.

The branching index, g', is inversely proportional to the amount of branching. Thus, lower values for g' indicate relatively higher amounts of branching. The amounts of short and long-chain branching each contribute to the branching index according to the formula: $g'=g'_{LCB} \times g'_{SCB}$. Thus, the branching index due to long-chain branching may be calculated from the experimentally determined value for g' as described by Scholte, et al., in J. App. Polymer Sci., 29, pp. 3763-3782 (1984), incorporated herein by reference.

While any suitable polymerization method (including solution or slurry polymerization methods) may be used, the ethylene-based polymers of the present invention may be readily obtained via a continuous gas phase polymerization using supported catalyst comprising an activated molecularly discrete catalyst in the substantial absence of an aluminum alkyl based scavenger (e.g., triethylaluminum (TEAL), trimethylaluminum (TMAL), triisobutyl aluminum (TIBAL), tri-n-hexylaluminum (TNHAL), and the like).

Ethylene-based polymers of the invention can be made with zirconium transition metal metallocene-type catalyst systems. Non-limiting examples of metallocene catalysts and catalyst systems useful in practicing the present invention include those described in, U.S. Pat. Nos. 5,466,649, 6,476,171, 6,225,426, and 7,951,873 and in the references cited therein, all of which are fully incorporated herein by reference.

Supported polymerization catalyst may be deposited on, bonded to, contacted with, or incorporated within, adsorbed or absorbed in, or on, a support or carrier. In another embodiment, the metallocene is introduced onto a support by slurrying a presupported activator in oil, a hydrocarbon such as pentane, solvent, or non-solvent, then adding the metallocene as a solid while stirring. The metallocene may be finely divided solids. Although the metallocene is typically of very low solubility in the diluting medium, it is found to distribute onto the support and be active for polymerization. Very low solubilizing media such as mineral oil (e.g., Kaydo™ or Drakol™) or pentane may be used. The diluent can be filtered off and the remaining solid shows polymerization capability much as would be expected if the catalyst had been prepared by traditional methods such as contacting the catalyst with methylalumoxane in toluene, contacting with the support, followed by removal of the solvent. If the diluent is volatile, such as pentane, it may be removed under vacuum or by nitrogen purge to afford an active catalyst. The mixing time may be greater than 4 hours, but shorter times are suitable.

Typically in a gas phase polymerization process, a continuous cycle is employed where in one part of the cycle of a reactor, a cycling gas stream, otherwise known as a recycle stream or fluidizing medium, is heated in the reactor by the heat of polymerization. This heat is removed in another part of the cycle by a cooling system external to the reactor. (See for example, U.S. Pat. Nos. 4,543,399, 4,588,790, 5,028, 670, 5,317,036, 5,352,749, 5,405,922, 5,436,304, 5,453,471, 5,462,999, 5,616,661, and 5,668,228, all of which are fully incorporated herein by reference.)

Generally, in a gas fluidized bed process for producing polymers, a gaseous stream containing one or more monomers is continuously cycled through a fluidized bed in the presence of a catalyst under reactive conditions. The gaseous stream is withdrawn from the fluidized bed and recycled back into the reactor. Simultaneously, polymer product is withdrawn from the reactor and fresh monomer is added to replace the polymerized monomer. The reactor pressure may vary from 100 psig (680 kPag)-500 psig (3448 kPag), or in the range of from 200 psig (1379 kPag)-400 psig (2759 kPag), or in the range of from 250 psig (1724 kPag)-350 psig (2414 kPag). The reactor operated at a temperature in the range of 60° C. to 120° C., 60° C. to 115° C., 70° C. to 110° C., 70° C. to 95° C., or 85° C. to 95° C. The productivity of the catalyst or catalyst system is influenced by the main monomer partial pressure. The mole percent of the main monomer, ethylene, is from 25.0-90.0 mole percent, or 50.0-90.0 mole percent, or 70.0-85.0 mole percent, and the monomer partial pressure is in the range of from 75 psia (517 kPa)-300 psia (2069 kPa), or 100-275 psia (689-1894 kPa), or 150-265 psia (1034-1826 kPa), or 200-250 psia (1378-1722 kPa), which are typical conditions in a gas phase polymerization process.

Other gas phase processes contemplated by the process of the invention include those described in U.S. Pat. Nos. 5,627,242, 5,665,818, and 5,677,375, and European Patent Application Nos. EP-A-0 794 200, EP-A-0 802 202, and EP-B-634 421, all of which are herein fully incorporated by reference.

It may be beneficial in slurry or gas phase processes to operate in the substantial absence of or essentially free of any scavengers, such as triethylaluminum, trimethylaluminum, triisobutylaluminum, and tri-n-hexylaluminum and diethyl aluminum chloride and the like. Such processes are described in PCT Publication No. WO 96/08520, which is herein fully incorporated by reference.

Additionally, the use of a process continuity aid, while not required, may be desirable in any of the foregoing processes. Such continuity aids are well-known to persons of skill in the art and include, for example, metal stearates.

Blends of Ethylene-Based Polymers

Ethylene-based polymers described herein can be blended with another polymer component, particularly other alpha-olefin polymers such as polyethylene homopolymer and copolymer compositions (e.g., LLDPE, HDPE, MDPE, LDPE, and other differentiated polyethylenes) and/or polypropylene. The ethylene-based polymer may be present in such blends in an amount of from 0.1 to 99.9 wt. %. The upper limit on the amount of ethylene-based polymer in such blends may be 99.5 wt. %, 99.0 wt. %, 98.0 wt. %, 97.0 wt. %, 96.0 wt. %, 95.0 wt. %, 90.0 wt. %, 85.0 wt. %, 80.0 wt. %, 75.0 wt. %, 70.0 wt. %, 60.0 wt. %, 50.0 wt. %, 40.0 wt. %, 30.0 wt. %, 25.0 wt. %, 20.0 wt. %, 15.0 wt. %, 10.0 wt. %, 5.0 wt. %, 4.0 wt. %, 3.0 wt. %, 2.0 wt. %, 1.0 wt. %, or 0.5 wt. %. The lower limit on the amount of ethylene-based polymer in such blends may be 99.5 wt. %, 99.0 wt. %, 98.0 wt. %, 97.0 wt. %, 96.0 wt. %, 95.0 wt. %, 90.0 wt. %, 85.0 wt. %, 80.0 wt. %, 75.0 wt. %, 70.0 wt. %, 60.0 wt. %, 50.0 wt. %, 40.0 wt. %, 30.0 wt. %, 25.0 wt. %, 20.0 wt. %, 15.0 wt. %, 10.0 wt. %, 5.0 wt. %, 4.0 wt. %, 3.0 wt. %, 2.0 wt. %, 1.0 wt. %, or 0.5 wt. %. Blend compositions including any upper and lower limit of ethylene-based polymer are envisioned (e.g., 0.5 to 99.5 wt. %, 10.0 to 90.0 wt. %, 20.0 to 80.0 wt. %, 25.0 to 75.0 wt. %, 40.0 to 60.0 wt. %, 45.0 to 55.0 wt. %, 5.0 to 50.0 wt. %, 10.0 to 40.0 wt. %, 20.0 to 30.0 wt. %, 50.0 to 95.0 wt. %, 60.0 to 90.0 wt. %, 70.0 to 80.0 wt. %, 1.0 to 15.0 wt. %, 1.0 to 10.0 wt. %, 1.0 to 5.0 wt. %, 85.0 to 99.0 wt. %, 90 to 99.0 wt. %, or 95.0 to 99.0 wt. %). The amount of ethylene-based polymer is based on the total weight of the polymer blend.

In certain embodiments, the ethylene-based polymer may be blended with one or more propylene-based polymers (e.g., homopolymer, copolymer, or impact copolymer including >50.0 mol % of polymer units derived from propylene). In addition to blends having the compositional limits described above, particularly useful polypropylene-containing blends comprise less than 50.0 wt. % (e.g., 2.0 to 49.5 wt. %, 5.0 to 45.0 wt. %, 7.5 to 42.5 wt. % 10.0 to 40.0 wt. %, 20.0 to 30.0 wt. %, 25.0 to 49.5 wt. %, 30.0 to 49.5 wt. %, 35.0 to 45.0 wt. %) propylene-based polymer. Some useful propylene-based polymers include those having one or more of the following properties:
1) propylene content of at least 85 wt. % (preferably at least 90 wt. %, preferably at least 95 wt. %, preferably at least 97 wt. %, preferably 100 wt. %); and/or
2) $M_w$ of 30 to 2,000 kg/mol (preferably 50 to 1,000 kg/mol, preferably 90 to 500 kg/mol); and/or
3) $M_w/M_n$ of 1 to 40 (preferably 1.4 to 20, preferably 1.6 to 10, preferably 1.8 to 3.5, preferably 1.8 to 2.5); and/or
4) branching index (g') of 0.2 to 2.0 (preferably 0.5 to 1.5, preferably 0.7 to 1.3, preferably 0.9 to 1.1); and/or
5) melt flow rate (MFR) of 1 to 300 dg/min (preferably 5 to 150 dg/min, preferably 10 to 100 dg/min, preferably 20 to 60 dg/min); and/or
6) melting point ($T_m$, peak second melt) of at least 100° C. (preferably at least 110° C., preferably at least 120° C., preferably at least 130° C., preferably at least 140° C., preferably at least 150° C., preferably at least 160° C., preferably at least 165° C.); and/or
7) crystallization temperature ($T_c$, peak) of at least 70° C. (preferably at least 90° C., preferably at least 110° C., preferably at least 130° C.); and/or
8) heat of fusion ($H_f$) of 40 to 160 J/g (preferably 50 to 140 J/g, preferably 60 to 120 J/g, preferably 80 to 100 J/g); and/or
9) crystallinity of 5 to 80% (preferably 10 to 75%, preferably 20 to 70%, preferably 30 to 65%, preferably 40 to 60%); and/or
10) propylene meso diads of 90% or more (preferably 92% or more, preferably 94% or more, preferably 96% or more); and/or
11) heat deflection temperature (HDT) of 45 to 140° C. (preferably 60 to 135° C., preferably 75 to 125° C.); and/or
12) Gardner impact strength at 23° C. of 30 to 1300 J (preferably 40 to 800 J, preferably 50 to 600 J); and/or
13) flexural modulus of 300 to 3000 MPa (preferably 600 to 2500 MPa, preferably 800 to 2000 MPa, preferably 1000 to 1500 MPa).

In a preferred embodiment, the propylene polymer is selected from polypropylene homopolymer, polypropylene copolymers, and blends thereof. The homopolymer may be atactic polypropylene, isotactic polypropylene, highly isotactic polypropylene, syndiotactic polypropylene, and blends thereof. The copolymer can be a random copolymer, a statistical copolymer, a block copolymer, and blends thereof.

The method of making the polypropylene is not critical, as it can be made by slurry, solution, gas-phase, high-pressure, or other suitable processes, through the use of catalyst systems appropriate for the polymerization of polyolefins, such as Ziegler-Natta-type catalysts, metallocene-type catalysts, other appropriate catalyst systems or combinations thereof. In a preferred embodiment, the propylene polymers are made by the catalysts, activators and processes described in U.S. Pat. Nos. 6,342,566, 6,384,142, and 5,741,563 and PCT Publication Nos. WO 03/040201 and WO 97/19991. Such catalysts are well-known in the art, and are described in, for example, ZIEGLER CATALYSTS (Gerhard Fink, Rolf Mülhaupt and Hans H. Brintzinger, eds., Springer-Verlag 1995); Resconi et al., *Selectivity in Propene Polymerization with Metallocene Catalysts,* 100 CHEM. REV., pp. 1253-1345 (2000); and I, II METALLOCENE-BASED POLYOLEFINS (Wiley & Sons, 2000).

Polypropylene homopolymers or copolymers useful in the present invention may have some level of isotacticity or syndiotacticity. In one embodiment, the polypropylene is isotactic polypropylene, and in another embodiment, the polypropylene is highly isotactic polypropylene. In a desirable embodiment, the polypropylene is a polypropylene homopolymer having at least 85% (preferably at least 90%) isotactic pentads. In another desirable embodiment, the polypropylene is a polypropylene homopolymer having at least 85% (preferably at least 90%) syndiotactic pentads.

In a particularly preferred embodiment, the propylene polymers useful herein are produced by a metallocene catalyst system, and have a $M_w/M_n$ of 1.5 to 3 (preferably 1.8 to 2.5) and a CDBI of 80 wt. % or more (preferably 90 wt. % or more).

In another embodiment, the propylene polymer is a random copolymer, also known as an "RCP," comprising propylene and up to 20 mole % of ethylene or a $C_4$ to $C_{20}$ olefin, preferably up to 20 mole % ethylene, preferably from 1 to 10 mole % ethylene.

The blends may be formed using conventional equipment and methods, such as by dry blending the individual components and subsequently melt mixing in a mixer, or by mixing the components together directly in a mixer, such as, for example, a Banbury mixer, a Haake mixer, a Brabender internal mixer, or a single or twin-screw extruder, which may include a compounding extruder and a side-arm extruder used directly downstream of a polymerization process. Additionally, additives may be included in the blend, in one or more components of the blend, and/or in a product formed from the blend, such as a film, as desired. Such additives are well-known in the art, and can include, for example: fillers; antioxidants (e.g., hindered phenolics such as IRGANOX™ 1010 or IRGANOX™ 1076 available from BASF); phosphites (e.g., IRGAFOS™ 168 available from BASF); tackifiers, such as polybutenes, terpene resins, aliphatic and aromatic hydrocarbon resins, alkali metal and glycerol stearates and hydrogenated rosins; UV stabilizers; heat stabilizers; antiblocking agents; pigments; colorants; dyes; waxes; silica; fillers; talc and the like.

End-Use Applications

Some properties of the ethylene-based polymers described herein are characterized by their performance in films. End-use applications of such films include, e.g., monolayer and multilayer blown, extruded, and/or cast films. Films including the ethylene-based polymer are also useful as cling film, sealing films, oriented films, snack packaging, heavy duty bags, grocery sacks, baked and frozen food packaging, medical packaging, industrial liners, membranes, etc., in food-contact and non-food contact applications. The combination of properties provided by the ethylene-based polymer particularly lend films, particularly cast films, made therefrom to use in stretch (and power pre-stretch) applications.

The total thickness of monolayer and multilayer films may vary based upon the application desired. A total film thickness of about 5-100 μm, more typically about 10-25 μm, is suitable for most applications. Those skilled in the art will appreciate that the thickness of individual layers for multilayer films may be adjusted based on desired end-use performance, resin or copolymer employed, equipment capability, and other factors. The materials forming each layer may be coextruded through a coextrusion feedblock and die assembly to yield a film with two or more layers adhered together, but differing in composition. Coextrusion can be adapted for use in both cast film or blown film processes.

Particular embodiments of the invention related to monolayer films comprising an ethylene-based polymer according to the invention. When used in multilayer films, the ethylene-based polymer may be used in any layer of the film, or in more than one layer of the film, as desired. When more than one layer of the film comprises an ethylene-based polymer, each such layer can be individually formulated; i.e., the layers comprising the ethylene-based polymer can be the same or different chemical composition, density, melt index, thickness, etc., depending upon the desired properties of the film.

Some films including ethylene-based polymers described herein are characterized by unique properties particularly suited to power stretch and power pre-stretch applications. For example, some films comprising ethylene-based polymers have one or more of the following properties: i) MD Tensile at Yield value of $7.50 \times 10^2$ to $11.00 \times 10^2$ psi, particularly $8.00 \times 10^2$ to $10.00 \times 10^2$ psi; ii) TD Tensile at Yield value of $6.00 \times 10^2$ to $10.00 \times 10^2$ psi, particularly $7.00 \times 10^2$ to $8.50 \times 10^2$ psi; iii) MD Ultimate Tensile strength value of $5.500 \times 10^3$ to $10.00 \times 10^3$ psi, particularly $6.000 \times 10^3$ to $8.00 \times 10^3$ psi; iv) TD Ultimate Tensile strength value of $5.000 \times 10^3$ to $7.500 \times 10^3$ psi, particularly $5.200 \times 10^3$ to $6.000 \times 10^3$ psi; and/or v) a MD Break Elongation of $4.00 \times 10^2$ to $7.50 \times 10^2$%, particularly, $4.75 \times 10^2$ to $6.50 \times 10^2$%.

Particularly in such applications, the relative performance of the films in the MD and TD dimensions is important. Thus, the ratio of the MD Tensile at Yield value to the TD Tensile at Yield value in some embodiments may be 0.50 to 0.75, particularly 0.55 to 0.65. In other embodiments, the ratio of the MD Ultimate Tensile strength to TD Ultimate Tensile strength may be 0.60 to 2.00, particularly 1.30 to 1.70. Some embodiments may have a ratio of the MD Break Elongation to TD Break Elongation of 0.45 to 1.50, particularly 0.65 to 1.00.

In addition, desirable stiffness, as reflected by the 1% Secant Modulus. Thus, some films having one or more of the properties described above may also have a MD 1% Secant Modulus measured according to ASTM D-882 of $13.500 \times 10^3$ to $16.500 \times 10^3$ psi, particularly 14.000 to $15.500 \times 10^3$ psi. Films may also have TD 1% Secant Modulus of $14.500 \times 10^3$ to $17.500 \times 10^3$ psi, particularly 15.000 to $16.500 \times 10^3$ psi. The average 1% Secant Modulus (i.e., the average of the 1% Secant Modulus in the machine direction (MD) and the 1% Secant Modulus in the transverse direction (TD)) may be $12.00 \times 10^3$ to $18.00 \times 10^3$ psi, particularly $13.00 \times 10^3$ to $16.00 \times 10^3$ psi. The ratio of the stiffness in the MD and TD directions may be 0.75 to 1.20, particularly 0.80 to 1.0.

Other combinations of properties include desirable elongation along with tensile strength, elongation, tear, and/or stiffness, particularly in the MD. Thus, some films may have a ratio of the MD Ultimate Tensile strength to MD Break elongation 6.50 to 25.00 psi/%, particularly 8.75 to 18.00 psi/%. Films may have a ratio of the MD Ultimate Tensile strength to the MD Elmendorf Tear of 12.0 to 50.0 psi·μm/g, particularly 18.0 to 32.0 psi·μm/g. Some films may have a ratio of the MD Ultimate Tensile strength to the MD 1% Secant Modulus of 0.30 to 0.75, particularly 0.38 to 0.57. Some films have desirable combination of elongation and tear or stiffness, particularly in the MD. Thus, some films may have a ratio of the MD Break Elongation to the Elmendorf Tear of 1.00 to 3.75%·μm/g, particularly 1.45 to 2.60%·μm/g. Some films may have a ratio of the MD Break Elongation to the MD 1% Secant Modulus of 0.024 to 0.056%/psi, particularly 0.030 to 0.046%/psi. Some films may have a ratio of the MD Elmendorf Tear to the MD 1% Secant Modulus of 0.012 to 0.030 psi·μm/g, particularly 0.016 to 0.023 psi·μm/g.

Such films may be formed by any number of well-known extrusion or coextrusion techniques discussed below. Films may be unoriented, uniaxially oriented or biaxially oriented. As described below, the films can be cast films or blown films. The films can further be embossed, or produced, or processed according to other known film processes. The films can be tailored to specific applications by adjusting the thickness, materials and order of the various layers, as well as the additives in or modifiers applied to each layer.

Films may be formed by using casting techniques, such as a chill roll casting process. For example, a composition can be extruded in a molten state through a flat die and then cooled to form a film. As a specific example, cast films can be prepared using a cast film line machine as follows. Pellets of the polymer are melted at a temperature typically ranging from about 250° C. to about 300° C. for cast ethylene-based polymers (depending upon the particular resin used), with the specific melt temperature being chosen to match the melt viscosity of the particular resin layers. In the case of a multilayer cast film, the two or more different melts are conveyed to a coextrusion adapter that combines the two or more melt flows into a multilayer, coextruded structure. This layered flow is distributed through a single manifold film extrusion die to the desired width. The die gap opening is typically about 0.025 inches (about 600 μm). The material is then drawn down to the final gauge. The material draw down ratio is typically about 21:1 for 0.8 mil (20 μm) films. A vacuum box, edge pinners, air knife, or a combination of the foregoing can be used to pin the melt exiting the die opening to a primary chill roll maintained at about 80° F. (32° C.). The resulting polymer film is collected on a winder. The film thickness can be monitored by a gauge monitor and the film can be edge trimmed by a trimmer A typical cast line rate is from about 250 to about 2000 feet per minute. One skilled in the art will appreciate that higher rates may be used for similar processes such as extrusion coating. One or more optional treaters can be used to surface treat the film, if desired. Such chill roll casting processes and apparatus are well-known in the art and are described, for example, in The Wiley-Encyclopedia of Packaging Technology, Second Edition, A. L. Brody and K. S. Marsh, Ed., John Wiley and Sons, Inc., New York (1997). Although chill roll casting is one example, other forms of casting may be employed.

Films containing the polymers compositions described herein may be formed using blown techniques, i.e., to form a blown film. For example, the composition can be extruded in a molten state through an annular die and then blown and cooled to form a tubular, blown film, which can then be axially slit and unfolded to form a flat film. As a specific example, blown films can be prepared as follows. The polymer composition is introduced into the feed hopper of an extruder, such as a 63.5 mm Egan extruder that is water-cooled, resistance heated, and has a L/D ratio of 24:1.

The film can be produced using a 15.24 cm Sano die with a 2.24 mm die gap, along with a Sano dual orifice non-rotating, non-adjustable air ring. The film is extruded through the die into a film cooled by blowing air onto the surface of the film. The film is drawn from the die typically forming a cylindrical film that is cooled, collapsed, and optionally subjected to a desired auxiliary process, such as slitting, treating, sealing, or printing. Typical melt temperatures are from about 175° C. to about 225° C. Blown film rates are generally from about 5 to about 30 lbs per hour per inch of die circumference. The finished film can be wound into rolls for later processing, or can be fed into a bag machine and converted into bags. A particular blown film process and apparatus suitable for forming films according to embodiments described herein are described in U.S. Pat. No. 5,569,693. Of course, other blown film forming methods can also be used.

PARTICULAR EMBODIMENTS

Embodiment A

An ethylene-based polymer comprising about 80.0 to 99.0 wt. % of polymer units derived from ethylene and about 1.0 to about 20.0 wt. % of polymer units derived from one or more $C_3$ to $C_{20}$ α-olefin comonomers; the ethylene-based polymer having: a CDBI of 60% to 80%; a melt index, $I_{2.16}$, of about 4.0 to about 12.0 g/10 min.; a high-load melt index, $I_{21.6}$, of 80.0 to about 160.0 g/10 min.; a melt index ratio $(I_{21.6}/I_{2.16})$ of 9.0 to 40.0; and a density of from about 0.910 to about 0.930 $g/cm^3$.

Embodiment B

The ethylene-based polymer of Embodiment A, wherein the melt index, $I_{2.16}$, is 6.0 to 10.0 g/10 min.

Embodiment C

The ethylene-based polymer of any of Embodiments A to B, wherein the high-load melt index, $I_{21.6}$, is 110.0 to 160.0 g/10 min.

Embodiment D

The ethylene-based polymer of any of Embodiments A to C, wherein the melt index ratio $(I_{21.6}/I_{2.16})$ is 10.0 to 22.0.

Embodiment E

The ethylene-based polymer of any of Embodiments A to D, wherein the density is 0.914 to 0.926 $g/cm^3$.

Embodiment F

The ethylene-based polymer of any of Embodiments A to E, wherein the one or more $C_3$ to $C_{20}$ α-olefin comonomers is selected from the group consisting of $C_3$ to $C_{10}$ α-olefins.

Embodiment G

The ethylene-based polymer of any of Embodiments A to F, wherein the one or more $C_3$ to $C_{20}$ α-olefin comonomers are selected form the group consisting of propylene, 1-butene, 1-hexene, 1-octene, and combinations thereof.

Embodiment H

The ethylene-based polymer of any of Embodiments A to G having from 0.0 to about 2.0 long chain branches/1000 total carbons.

Embodiment I

A film comprising an ethylene-based polymer of any of Embodiments A to H.

Embodiment J

The film of Embodiment I, wherein the film has a MD Ultimate Tensile strength value of $5.500 \times 10^3$ to $10.00 \times 10^3$ psi and a Break Elongation of $4.00 \times 10^2$ to $7.50 \times 10^2$%.

Embodiment K

The film of any of Embodiments I or J having a MD Tensile at Yield value of $7.50 \times 10^2$ to $11.00 \times 10^2$ psi.

Embodiment L

The film of any of the Embodiments I to K having a TD Tensile at Yield value of $6.00 \times 10^2$ to $10.00 \times 10^2$ psi and a TD Ultimate Tensile strength value of $5.000 \times 10^3$ to $7.500 \times 10^3$ psi.

Embodiment M

A film according to any of Embodiments I to L having a ratio of the MD Tensile at Yield value to the TD Tensile at Yield value of 0.50 to 0.75, particularly 0.55 to 0.65.

Embodiment N

A film according to any of Embodiments I to M having a ratio of the MD Ultimate Tensile strength to TD Ultimate Tensile strength of 0.60 to 2.00, particularly 1.30 to 1.70.

Embodiment O

A film according to any of Embodiments I to N having a ratio of the MD Break Elongation to TD Break Elongation of 0.45 to 1.50, particularly 0.65 to 1.00.

Embodiment P

A film according to any of Embodiments I to O having a MD 1% Secant Modulus measured according to ASTM D-882 of $13.500 \times 10^3$ to $16.500 \times 10^3$ psi, particularly 14.000 to $15.500 \times 10^3$ psi.

Embodiment Q

A film according to any of Embodiments I to P having TD 1% Secant Modulus of $14.500 \times 10^3$ to $17.500 \times 10^3$ psi, particularly 15.000 to $16.500 \times 10^3$ psi.

Embodiment R

A film according to any of Embodiments I to Q having average 1% Secant Modulus of $12.00 \times 10^3$ to $18.00 \times 10^3$ psi, particularly $13.00 \times 10^3$ to $16.00 \times 10^3$ psi.

Embodiment S

A film according to any of Embodiments I to R having a ratio of the MD 1% Secant Modulus to the TD 1% Secant Modulus of 0.75 to 1.20, particularly 0.80 to 1.0.

Embodiment T

A film according to any of Embodiments I to S having a ratio of the MD Ultimate Tensile strength to the MD Break elongation of 6.50 to 25.00 psi/%, particularly 8.75 to 18.00 psi/%.

Embodiment U

A film according to any of Embodiments I to T having a ratio of the MD Ultimate Tensile strength to the MD Elmendorf Tear of 12.0 to 50.0 psi·μm/g, particularly 18.0 to 32.0 psi·μm/g.

Embodiment V

A film according to any of Embodiments I to U having a ratio of the MD Ultimate Tensile strength to the MD 1% Secant Modulus of 0.30 to 0.75, particularly 0.38 to 0.57.

Embodiment X

A film according to any of Embodiments I to V having a ratio of the MD Break Elongation to the Elmendorf Tear of 1.00 to 3.75%·μm/g, particularly 1.45 to 2.60%·μm/g.

Embodiment Y

A film according to any of Embodiments I to X having a ratio of the MD Break Elongation to the MD 1% Secant Modulus of 0.024 to 0.056%/psi, particularly 0.030 to 0.046%/psi.

Embodiment Z

A film according to any of Embodiments I to Y having a ratio of the MD Elmendorf Tear to the MD 1% Secant Modulus of 0.012 to 0.030 psi·μm/g, particularly 0.016 to 0.023 psi·μm/g.

Embodiment AA

The film of any of the Embodiments I to Z, wherein the film is a cast monolayer film.

Embodiment AB

A film according to any of Embodiments I, wherein the film has a MD Tensile at Yield value of $7.50 \times 10^2$ to $11.00 \times 10^2$ psi and a Break Elongation of $4.00 \times 10^2$ to $7.50 \times 10^2$%, a MD Ultimate Tensile strength value of $5.500 \times 10^3$ to $10.00 \times 10^3$ psi, a TD Tensile at Yield value of $6.00 \times 10^2$ to $10.00 \times 10^2$ psi, and a TD Ultimate Tensile strength value of $5.000 \times 10^3$ to $7.500 \times 10^3$ psi, wherein the ethylene-based polymer comprises about 80.0 to 99.0 wt. % of polymer units derived from ethylene and about 1.0 to about 20.0 wt. % of polymer units derived from one or more $C_3$ to $C_{20}$ α-olefin comonomers; the ethylene-based polymer having: a CDBI of 60% to 80%; a melt index, $I_{2.16}$, of about 6.0 to about 10.0 g/10 min.; a high-load melt index, $I_{21.6}$, of 110.0 to about 160.0 g/10 min.; a melt index ratio ($I_{21.6}/I_{2.16}$) of 10.0 to 22.0; and a density of from about 0.914 to about 0.926 g/cm$^3$.

EXAMPLES

Test Methods

The properties described herein can be determined in accordance with the following test procedures. Where any of these properties is referenced in the appended claims, it is to be measured in accordance with the specified test procedure.

Where applicable, the properties and descriptions below are intended to encompass measurements in both the machine and transverse directions. Such measurements are reported separately with the designation "MD" indicating a measurement in the machine direction and "TD" indicating a measurement in the transverse direction.

Gauge, in μm, is measured using a Measuretech Series 200 instrument. The instrument measures film thickness using a capacitance gauge. For each film sample, ten film thickness datapoints are measured per inch of film as the film is passed through the gauge in a transverse direction. From these measurements, an average gauge measurement is determined and reported.

Elmendorf Tear, in grams (g) or grams per μm (g/μm), is measured as specified by ASTM D-1922.

Tensile Strength at Yield, in pounds per square inch (lb/in$^2$ or psi), is measured as specified by ASTM D-882.

Tensile Strength at Break, in pounds per square inch (lb/in$^2$ or psi), is measured as specified by ASTM D-882.

Ultimate Tensile Strength, in pounds per square inch (lb/in$^2$ or psi), is measured as specified by ASTM D-882.

Tensile Peak Load, in pounds (lb), is measured as specified by ASTM D-882.

Tensile Energy, in inch-pounds (in-lb), is measured as specified by ASTM D-882.

Elongation at Break, as a percentage (%), is measured as specified by ASTM D-882.

1% Secant Modulus (M), in pounds per square inch (lb/in$^2$ or psi), is measured as specified by ASTM D-882.

Haze, reported as a percentage (%), is measured as specified by ASTM D-1003.

Gloss, a dimensionless number, is measured as specified by ASTM D-2457 at 45°.

Melt Index, $I_{2.16}$, reported in grams per 10 minutes (g/10 min.), refers to the melt flow rate measured according to ASTM D-1238 (190° C./2.16 kg).

High Load Melt Index, $I_{21.6}$, reported in grams per 10 minutes (g/10 min.), refers to the melt flow rate measured according to ASTM D-1238 (190° C./21.6 kg).

Melt Index Ratio (MIR), a dimensionless number, is the ratio of the high load melt index to the melt index, or $I_{21.6}/I_{2.16}$.

Density, in grams per cubic centimeter (g/cm$^3$), is determined using chips cut from plaques compression molded in accordance with ASTM D-1928 Procedure C, aged in accordance with ASTM D-618 Procedure A, and measured as specified by ASTM D-1505.

Peak Puncture Force, in pounds (lb) and/or pounds per mil (lb/mil), is determined according to ASTM D-5748, with the exception that the ¾" pear-shaped TFE-fluorocarbon coated probe referred to in the procedure is replaced with a ¾" pear-shaped Teflon™ coated stainless steel probe.

Puncture Break Energy, in inch-pounds (in-lb) and/or inch-pounds per mil (in-lb/mil), is determined according to ASTM D-5748, with the exception that the ¾" pear-shaped TFE-fluorocarbon coated probe referred to in the procedure is replaced with a ¾" pear-shaped stainless steel with a matte finish rather than the TFE fluorocarbon coating.

Haze, reported as a percentage (%), is measured as specified by ASTM D-1003.

Dart Drop Impact or Dart Drop Impact Strength (DIS), reported in grams (g) and/or grams per μm (g/μm), is measured as specified by ASTM D-1709, method A. Dart drop utilized black, phenolic head (material C). Values obtained 10 days after the films are made are denoted D10, while those obtained 20 days after the films are made are denoted D20.

Where any of the above properties are reported in pounds per square inch, grams per μm, or in any other dimensions that are reported per unit area or per unit thickness, the ASTM methods cited for each property have been followed except that the film gauge is measured in accordance with ASTM D-374, Method C.

Polymer Examples

Inventive LLDPE resins were prepared using the metallocene catalysts and gas phase processes described above. In particular, preparation of the inventive LLDPEs used in the following examples was substantially described in the examples set forth in U.S. Pat. No. 6,090,740, which is incorporated by reference herein in its entirety. Process conditions were manipulated as needed to achieve resins having the resulting density and melt index measurements identified below.

Example 1

Ethylene is polymerized with 1-hexene using supported bis(n-butylcyclopentadienyl)zirconium dichloride under the conditions reported in Table 1. Process conditions are manipulated to a polymer having a density of 0.9186 g/cm$^3$, a melt index ($I_{2.16}$) of 7.77 g/10 min., a high load melt index ($I_{21.6}$) of 129.0.

Example 2 (Comparative)

Ethylene is polymerized with 1-hexene using bis(n-butylcyclopentadienyl)zirconium dichloride. Process conditions are manipulated to a polymer having a density of 0.9186 g/cm$^3$, a melt index ($I_{2.16}$) of 3.33 g/10 min., a high load melt index ($I_{21.6}$) of 53.9.

TABLE 1

Polymerization Conditions and Resin Properties

| | Ex. 1 | Ex. 2 (Comparative) |
|---|---|---|
| Temp, F. (° C.) | 180 (82.2) | 185 (85.0) |
| Pressure, psig (MPa) | 297 (2.05) | 300 (2.07) |
| Ethylene, mol % | 49.9 | 50 |
| Hexene:Ethylene, mol % $C_6$/mol % $C_2$ | 0.0259 | 0.024 |
| Hydrogen:Ethylene, ppm H/mol % $C_2$ | 5.1 | 6.0 |
| Melt Index ($I_2$), g/10 min | 7.77 | 3.33 |
| Flow Index ($I_{21}$), g/10 min | 129.0 | 53.9 |
| MFR ($I_{21}/I_2$) | 16.6 | 16.2 |
| Density, g/cm$^3$ | 0.9186 | 0.9187 |

Film Examples

Example 3

A pseudomonolayer film having a nominal thickness of about 20 μm is formed by a cast film process wherein each of two extruders is loaded with the ethylene-based polymer of Example 1 and processed into the film according to the conditions in Table 2. The resulting film is constrained by the equipment used in this experiment to five layers but in this example all five layers consist of the same materials.

Example 4 (Comparative)

A film comprising the ethylene-based polymer of Example 2 is prepared in substantially the same manner as for Example 3 according to the conditions in Table 2.

TABLE 2

Cast Film Processing Conditions

| | Ex. 3 | Ex. 4 (Comparative) |
|---|---|---|
| Extruder A | | |
| Melt Temp, F. (° C.) | 532 (278) | 541 (283) |
| Head Pressure, psi (MPa) | 1050 (7.239) | 2081 (14.35) |
| Extruder Amps | 94 | 135 |
| Screw RPM | 29 | 29 |
| Rate, lbs/hr (kg/hr) | 236 | 236 |
| Extruder B | | |
| Melt Temp, F. (° C.) | 475 (246) | 493 (256) |
| Head Pressure, psi (MPa) | 1137 (7.839) | 2066 (14.244) |
| Extruder Amps | 111 | 150 |
| Screw RPM | 40 | 38 |
| Rate, lbs/hr. (kg/hr.) | 348 | 346 |
| Chill Roll | | |
| Primary Supply, F. (° C.) | 77.7 (25.4) | 78.6 (25.9) |
| Return Supply, F. (° C.) | 79.6 | 78.4 |
| Line Speed, fpm | 716 | 716 |

Properties of the resulting films are reported in Table 3.

TABLE 3

Film Properties

| | Ex. 3 | Ex. 4 (Comparative) |
|---|---|---|
| Gauge, mils (μm) | | |
| Average | 0.78 (19.8) | 0.81 (20.6) |
| Min | 0.71 (18.0) | 0.68 (17.3) |
| Max | 0.85 (21.6) | 0.89 (22.6) |
| Tensile @ Yield, psi (MPa) | | |
| MD | 851 (5.87) | 929 (6.41) |
| TD | 780 (5.38) | 850 (5.86) |
| Ultimate Tensile, psi (MPa) | | |
| MD | 6,462 (44.55) | 9,159 (63.15) |
| TD | 5,617 (38.73) | 6,521 (44.96) |
| Break Elongation, % | | |
| MD | 542 | 491 |
| TD | 675 | 687 |
| 1% Secant Modulus, psi (MPa) | | |
| MD | 14,562 (100.40) | 13,984 (96.416) |
| TD | 15,787 (108.85) | 16,440 (113.35) |
| Puncture (A) | | |
| Peak Force, lbs (kg) | 6.0 (2.7) | 6.4 (2.9) |
| Peak Force, lbs/mil (kg/μm) | 7.7 (0.14) | 7.9 (0.14) |
| Break Energy, in · lbs (mm · kg) | 17.2 (198) | 17.7 (204) |
| Break Energy, in · lbs/mil (mm · kg/μm) | 22.1 (10.0) | 21.9 (9.93) |
| Elmendorf Tear | | |
| MD, g | 223 | 186 |
| MD, g/mil (g/μm) | 273 (10.7) | 231 (9.09) |

TABLE 3-continued

Film Properties

|  | Ex. 3 | Ex. 4 (Comparative) |
|---|---|---|
| TD, g | 421 | 428 |
| TD, g/mil (g/μm) | 508 (20.0) | 515 (20.3) |
| Dart Drop (D10) | | |
| g | 152 | 528 |
| g/mil (g/μm) | 194 (7.64) | 652 (25.7) |
| Dart Drop (D20) | | |
| g | 109 | 432 |
| g/mil (g/μm) | 136 (5.35) | 540 (21.3) |
| 45 deg Gloss | | |
| MD | 81 | 85 |
| TD | 81 | 85 |
| Haze, % | 3.6 | 2.4 |

Although the present invention has been described in considerable detail with reference to certain aspects and embodiments thereof, other aspects and embodiments are possible. Therefore, the spirit and scope of the appended claims should not be limited to the description of the embodiments contained herein.

Certain features of the present invention are described in terms of a set of numerical upper limits and a set of numerical lower limits. It should be appreciated that ranges from any lower limit to any upper limit are within the scope of the invention unless otherwise indicated.

All documents described herein, including any priority documents and/or testing procedures to the extent they are not inconsistent with this text are incorporated by reference herein for all jurisdictions in which such incorporation is permitted, provided, however, that any priority document not named in the initially filed application or filing documents is NOT incorporated by reference herein. As is apparent from the foregoing general description and the specific embodiments, while forms of the invention have been illustrated and described, various modifications can be made without departing from the spirit and scope of the invention. Accordingly, it is not intended that the invention be limited thereby. Likewise, the term "comprising" is considered synonymous with the term "including" for purposes of Australian law. Likewise, whenever a composition, an element or a group of elements is preceded with the transitional phrase "comprising," it is understood that we also contemplate the same composition or group of elements with transitional phrases "consisting essentially of," "consisting of," "selected from the group of consisting of," or "is" preceding the recitation of the composition, element, or elements and vice versa. In addition, the compositions, individual film layers and the overall film may be substantially free or essentially free (i.e., having less than 2.0 wt. % or less than 0.5 wt. %) of any additional component, additive, modifier, etc., not expressly recited.

What is claimed is:

1. An ethylene-based polymer comprising about 80.0 to 99.0 wt % of polymer units derived from ethylene and about 1.0 to about 20.0 wt % of polymer units derived from one or more $C_3$ to $C_{20}$ α-olefin comonomers; the ethylene-based polymer having:
   a. a CDBI of 60% to 80%;
   b. a melt index, $I_{2.16}$, of about 4.0 to about 12.0 g/10 min.;
   c. a high-load melt index, $I_{21.6}$, of 80.0 to about 160.0 g/10 min.;
   d. a melt index ratio ($I_{21.6}/I_{2.16}$) of 10.0 to 22.0; and
   e. a density of from about 0.910 to about 0.930 g/cm³.

2. The ethylene-based polymer of claim 1, wherein the melt index, $I_{2.16}$, is 6.0 to 10.0 g/10 min.

3. The ethylene-based polymer of claim 1, wherein the high-load melt index, $I_{21.6}$, is 110.0 to 160.0 g/10 min.

4. The ethylene-based polymer of claim 1, wherein the density is 0.914 to 0.926 g/cm³.

5. The ethylene-based polymer of claim 1, wherein the one or more $C_3$ to $C_{20}$ α-olefin comonomers selected from the group consisting of $C_3$ to $C_{10}$ α-olefins.

6. The ethylene-based polymer of claim 1, wherein the one or more $C_3$ to $C_{20}$ α-olefin comonomers are selected from the group consisting of propylene, 1-butene, 1-hexene, 1-octene, and combinations thereof.

7. The ethylene-based polymer of claim 1, wherein the polymer has from 0.0 to about 2.0 long chain branches/1000 total carbons.

8. An ethylene-based polymer comprising about 80.0 to 99.0 wt % of polymer units derived from ethylene and about 1.0 to about 20.0 wt % of polymer units derived from one or more $C_3$ to $C_{20}$ α-olefin comonomers; the ethylene-based polymer having:
   a. a CDBI of 60% to 80%;
   b. a melt index, $I_{2.16}$, of about 4.0 to about 12.0 g/10 min.;
   c. a high-load melt index, $I_{21.6}$, of 80.0 to about 160.0 g/10 min.;
   d. a melt index ratio ($I_{21.6}/I_{2.16}$) of 9.0 to 27.5; and
   e. a density of from about 0.910 to about 0.930 g/cm³.

9. A film comprising an ethylene-based polymer comprising about 80.0 to 99.0 wt % of of polymer units derived from ethylene and about 1.0 to about 20.0 wt % of polymer units derived from one or more $C_3$ to $C_{20}$ α-olefin comonomers; the ethylene-based polymer having:
   a. a CDBI of 60% to 80%;
   b. a melt index, $I_{2.16}$, of about 4.0 to about 12.0 g/10 min.;
   c. a high-load melt index, $I_{21.6}$, of 80.0 to about 160.0 g/10 min.;
   d. a melt index ratio ($I_{21.6}/I_{2.16}$) of 9.0 to 40.0; and
   e. a density of from about 0.910 to about 0.930 g/cm³;
   wherein the film has a MD Ultimate Tensile strength value of $5.500 \times 10^3$ to $10.00 \times 10^3$ psi and a Break Elongation of $4.00 \times 10^2$ to $7.50 \times 10^2$%.

10. The film of claim 9 having a MD Tensile at Yield value of $7.50 \times 10^2$ to $11.00 \times 10^2$ psi.

11. The film of claim 9, having a TD Tensile at Yield value of $6.00 \times 10^2$ to $10.00 \times 10^2$ psi and a TD Ultimate Tensile strength value of $5.000 \times 10^3$ to $7.500 \times 10^3$ psi.

12. The film of claim 9, wherein the melt index, $I_{2.16}$, of the ethylene-based polymer is 6.0 to 10.0 g/10 min.

13. The film of claim 9, wherein the high-load melt index, $I_{21.6}$, of the ethylene-based polymer is 120.0 to 140.0 g/10 min.

14. The film of claim 9, wherein the melt index ratio ($I_{21.6}/I_{2.16}$) of the ethylene-based polymer is 10.0 to 22.0.

15. The film of claim 9, wherein the density of the ethylene-based polymer is 0.914 to 0.926 g/cm³.

16. The film of claim 9, wherein the one or more $C_3$ to $C_{20}$ α-olefin comonomers are selected from the group consisting of $C_3$ to $C_{10}$ α-olefins.

17. The film of claim 9, wherein the one or more $C_3$ to $C_{20}$ α-olefin comonomers are selected from the group consisting of propylene, 1-butene, 1-hexene, 1-octene, and combinations thereof.

18. The film of claim 9, wherein the ethylene-based polymer has from 0.0 to about 2.0 long chain branches/1000 total carbons.

19. The film of claim 9, wherein the film is a cast monolayer film.

20. A film comprising an ethylene-based polymer comprising about 80.0 to 99.0 wt % of of polymer units derived from ethylene and about 1.0 to about 20.0 wt % of polymer units derived from one or more $C_3$ to $C_{20}$ α-olefin comonomers; the ethylene-based polymer having:
  a. a CDBI of 60% to 80%;
  b. a melt index, $I_{2.16}$, of about 6.0 to about 10.0 g/10 min.;
  c. a high-load melt index, $I_{21.6}$, of 120.0 to about 140.0 g/10 min.;
  d. a melt index ratio ($I_{21.6}/I_{2.16}$) of 10.0 to 22.0; and
  e. a density of from about 0.914 to about 0.926 g/cm$^3$;
  wherein the film has a MD Tensile at Yield value of $7.50 \times 10^2$ to $11.00 \times 10^2$ psi and a Break Elongation of $4.00 \times 10^2$ to $7.50 \times 10^2$%, a MD Ultimate Tensile strength value of $5.500 \times 10^3$ to $10.00 \times 10^3$ psi, a TD Tensile at Yield value of $6.00 \times 10^2$ to $10.00 \times 10^2$ psi, and a TD Ultimate Tensile strength value of $5.000 \times 10^3$ to $7.500 \times 10^3$ psi.

* * * * *